US009791573B2

(12) United States Patent
Feltham et al.

(10) Patent No.: US 9,791,573 B2
(45) Date of Patent: Oct. 17, 2017

(54) INTELLIGENT GLOBAL POSITIONING SYSTEM SERVICE (71) Applicant: International Business Machines Corporation, Armonk, NY (US)

(72) Inventors: Andrew S. Feltham, Hampshire (GB); Dominic P. Harries, Hampshire (GB); Graham White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/755,448

(22) Filed: Jun. 30, 2015

(65) Prior Publication Data

US 2017/0003135 A1    Jan. 5, 2017

(51) Int. Cl.
*G01S 19/39* (2010.01)
*G01C 21/34* (2006.01)
*G01C 21/36* (2006.01)

(52) U.S. Cl.
CPC .......... *G01S 19/39* (2013.01); *G01C 21/3641* (2013.01)

(58) Field of Classification Search
None
See application file for complete search history.

(56) References Cited

U.S. PATENT DOCUMENTS

| | | | |
|---|---|---|---|
| 5,146,219 A * | 9/1992 | Zechnall | B60K 31/0058 340/905 |
| 5,844,505 A * | 12/1998 | Van Ryzin | G01C 21/3602 340/905 |
| 7,197,394 B2 | 3/2007 | Ohler | |
| 8,718,932 B1 * | 5/2014 | Pack | G01C 21/005 701/446 |
| 8,862,387 B2 | 10/2014 | Kandangath et al. | |
| 2006/0041378 A1 | 2/2006 | Cheng et al. | |
| 2009/0063045 A1 * | 3/2009 | Figueroa | G01C 21/26 701/414 |
| 2009/0157294 A1 | 6/2009 | Geelen et al. | |

(Continued)

FOREIGN PATENT DOCUMENTS

WO    2010040387 A1    4/2010

OTHER PUBLICATIONS

"Adaptive satellite navigation system voice prompt verbosity based on previous travel statistics", An IP.com Prior Art Database Technical Disclosure, Publication Date: Dec. 6, 2013, IP.com No. 000233327, 2 pages, <https://priorart.ip.com/IPCOM/000233327>.

(Continued)

*Primary Examiner* — Jean-Paul Cass
(74) *Attorney, Agent, or Firm* — Maeve Carpenter (57) ABSTRACT An approach for an intelligent GPS service is provided. The approach monitors a plurality of routes, wherein the plurality of routes are routes traveled by a user in a plurality of successive journeys. The approach determines one or more common sub-routes within the plurality of routes, the one or more common sub-routes having a plurality of points in common with each other. The approach determines whether the one or more common sub-routes exceed a pre-determined threshold. The approach flags each of the one or more common sub-routes exceeding a pre-determined threshold. The approach identifies one or more flagged common-sub-routes within a calculated route.

17 Claims, 3 Drawing Sheets

(56) References Cited

U.S. PATENT DOCUMENTS

| | | | | |
|---|---|---|---|---|
| 2011/0099171 A1* | 4/2011 | Van Buer | ............... | G01C 21/32 |
| | | | | 707/737 |
| 2013/0204527 A1* | 8/2013 | Schilling | ............... | G01C 21/34 |
| | | | | 701/533 |
| 2013/0311081 A1* | 11/2013 | Yamakawa | ............ | G01C 21/00 |
| | | | | 701/428 |
| 2013/0325323 A1* | 12/2013 | Breed | .................... | G01C 21/34 |
| | | | | 701/420 |
| 2014/0214322 A1* | 7/2014 | Tsimhoni | ............... | G01C 21/34 |
| | | | | 701/534 |
| 2015/0234444 A1* | 8/2015 | Aasheim | ............... | G06F 1/3206 |
| | | | | 713/320 |
| 2015/0268056 A1* | 9/2015 | Gueziec | ............ | G01C 21/3492 |
| | | | | 701/117 |

OTHER PUBLICATIONS

"Method and System for Optimizing Navigation Instructions Based on Familiarity of Routes", An IP.com Prior Art Database Technical Disclosure, Publication Date: Jan. 5, 2012, IP.com No. 000213903, 3 pages, <https://priorart.ip.com/IPCOM/000213903>.

* cited by examiner

INTELLIGENT GLOBAL POSITIONING SYSTEM SERVICE

BACKGROUND OF THE INVENTION

The present invention relates generally to global positioning systems, and more particularly to an intelligent global positioning system service.

Conventional global positioning systems (GPS) can be helpful to users navigating to unfamiliar destinations. Typically, GPS units display directions on a screen and/or provide spoken navigation instructions.

Some destinations that users may travel to may have one or more common route subsets (e.g., when traveling north, a user may typically navigate the same route from the user's residence along a given highway, regardless of a northern end destination). In some cases, it may be distracting or annoying for a GPS unit to assist with directions that are well known to the user.

SUMMARY

Aspects of an embodiment of the present invention disclose a method, a computer system, and a computer program product for an intelligent global positioning system (GPS) service, in accordance with an embodiment of the present invention. In one aspect, a method includes monitoring, by one or more computer processors, a plurality of routes, wherein the plurality of routes are routes traveled by a user in a plurality of successive journeys. The method includes determining, by one or more computer processors, one or more common sub-routes within the plurality of routes, the one or more common sub-routes having a plurality of points in common with each other. The method includes determining, by one or more computer processors, whether the one or more common sub-routes exceed a pre-determined threshold. The method includes flagging, by one or more computer processors, each of the one or more common sub-routes exceeding a pre-determined threshold. The method includes identifying, by one or more computer processors, one or more flagged common-sub-routes within a calculated route.

DETAILED DESCRIPTION

Embodiments of the present invention recognize that some journeys that a user embarks on via a personal vehicle, a bicycle, and walking, etc., may share one or more common route subsets, such that the user may navigate the same route from an originating location regardless of an eventual desired destination. Embodiments of the present invention recognize that, in this case, a user may only require route navigation assistance for part of their journey, and as such, it may be distracting to have route navigation assistance for directions that are well known to the user.

Embodiments of the present invention provide the capability to selectively suppress route navigation assistance (i.e., navigation instructions) provided by a satellite navigation device (e.g., GPS, navigation system, etc.) on a client device. Embodiments of the present invention further provide the capability to learn a plurality of frequently traveled routes and disable detailed driving directions for the plurality of frequently traveled routes.

Implementation of such embodiments may take a variety of forms, and exemplary implementation details are discussed subsequently with reference to the Figures.

Figure 1:
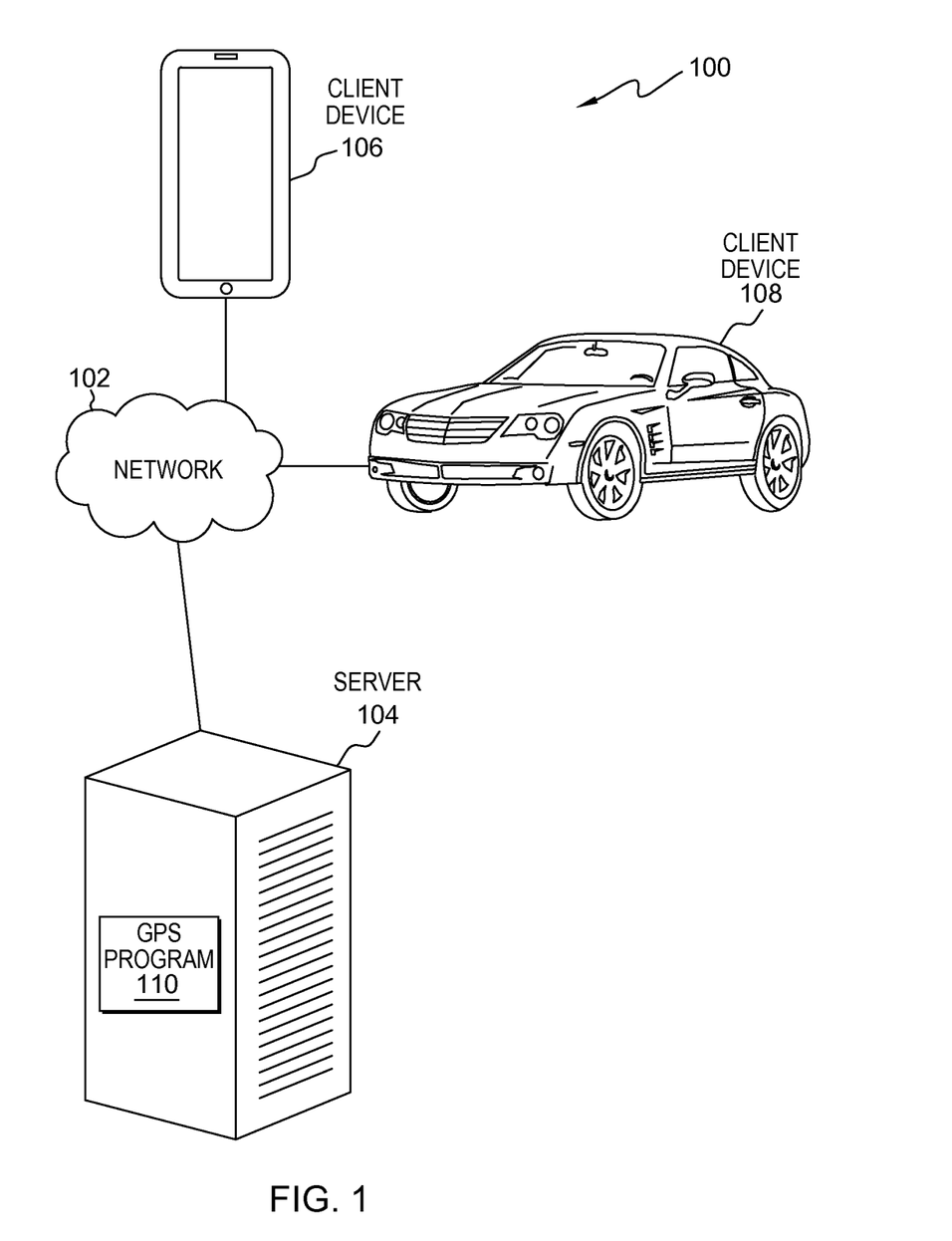
FIG. 1 is a functional block diagram illustrating a data processing environment, generally designated 100, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, and one or more client devices, such as client device 106 and client device 108.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, and client device 108 are interconnected by network 102. Network 102 can be any combination of connections and protocols capable of supporting communications between server 104, client device 106, client device 108 and GPS program 110. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In one embodiment, server 104 includes a GPS program 110 for providing an intelligent GPS service on a client device, such as client device 106 and client device 108.

In one embodiment, GPS program 110 operates on a central server, such as server 104, and can be utilized by one or more client devices, such as client device 106 and client device 108, via an application download from the central server or a third-party application store, and executed on the one or more client devices. In another embodiment, GPS program 110 may be a software-based program, downloaded from a central server, such as server 104, and installed on one or more client devices, such as client device 106 and client device 108. In yet another embodiment, GPS program 110 may be utilized as a software service provided by a third-party cloud service provider (not shown).

In one embodiment, GPS program 110 is a conventional GPS system (e.g., a navigation system) typically utilized by a client device, such as client device 106 and client device 108, for navigation between two or more locations. In one embodiment, GPS program 110 provides the capability to plot a route between two or more locations on a map. In one embodiment, GPS program 110 may provide a visual area of a portion of the map, where the visual area can include a route along the map, as well as areas of the map off-route. In one embodiment, GPS program 110 utilizes location services (i.e., global position systems) to identify a location of a user's client device, such as client device 106 and client device 108, on a map, and monitor the location of the user's client device on the map as that location changes.

In one embodiment, GPS program 110 is a software-based program capable of providing an intelligent GPS service that can learn one or more routes that a user frequently travels, and where the one or more routes are included in driving directions to an unfamiliar destination, disable detailed driving directions for each of the one or more routes frequently traveled by a user. In one embodiment, GPS program 110 is an add-on feature for a conventional navigation system (not shown), where the add-on feature enables a user to disable detailed driving directions for well known, frequently traveled routes. In one embodiment, GPS program 110 is fully integrated with a navigation system. In some embodiments, GPS program 110 may be partially integrated or separate from a conventional navigation system. In one embodiment, GPS program 110 may be an application, downloaded from an application store or third party provider, capable of being used in conjunction with an existing conventional navigation system on a client device, such as client device 106 and client device 108, to provide an intelligent GPS service.

In one embodiment, client device 106 and client device 108 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device capable of connecting to a network, such as network 102, to access the Internet, utilize location services, and utilize a navigation system. In another example, client device 108 may be an on-board computer within a motor vehicle. In one embodiment, client device 106 and client device 108 may be any suitable type of client device capable of executing one or more applications, including a smart phone, tablet, slate, or any type of device that utilizes a mobile operating system. In one embodiment, client device 106 and client device 108 may include a user interface (not shown) for providing a user with the capability to interact with GPS program 110. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In one embodiment, client device 106 and client device 108 may be any wearable electronic devices, including wearable electronic devices affixed to eyeglasses and sunglasses, helmets, wristwatches, clothing, wigs, and the like, capable of sending, receiving, and processing data. For example, client device 106 may be a wearable electronic device, such as a wristwatch, capable of executing an application and utilizing location services in conjunction with a navigation system to monitor a user's location on a map, provide route navigation assistance to the user, and disable detailed directions for frequently traveled routes.

Figure 2:
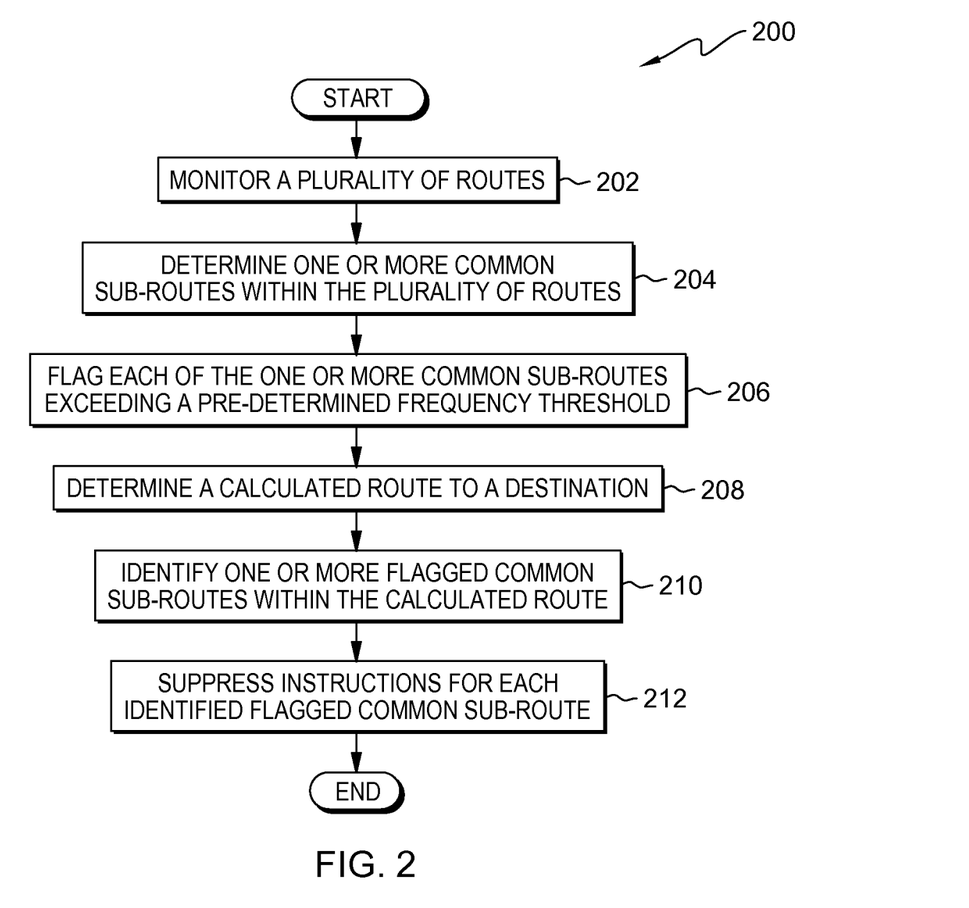
FIG. 2 is a flowchart depicting operational steps of an intelligent global positioning program, such as the GPS program of FIG. 1, generally designated 200, for providing an intelligent GPS service, in accordance with an embodiment of the present invention.

FIG. 2 is a flowchart of the steps of a GPS program, such as GPS program 110, generally designated 200, for providing an intelligent GPS service, in accordance with an embodiment of the present invention.

GPS program 110 monitors a plurality of routes (202). In one embodiment, GPS program 110 monitors a plurality of routes traveled by a user in a plurality of successive journeys (i.e., trips). In one embodiment, GPS program 110 may monitor a plurality of routes passively, such as recording traveled routes in a database (not shown). In another embodiment, GPS program 110 may monitor a plurality of routes actively, such as operating in a manner similarly to a conventional satellite navigation system (i.e., GPS, pings, triangulation, etc.). In one embodiment, GPS program 110 may monitor a plurality of routes using a combination of passive and active monitoring, such as monitoring each change in direction along a route, and recording the route traveled from an originating location to a final destination as a line-string in a database for future reference.

GPS program 110 determines one or more common sub-routes within the plurality of routes (204). In one embodiment, GPS program 110 determines one or more common sub-routes within the plurality of routes by modeling each of the plurality of routes as a route, r, including an ordered set of points on a two-dimensional plane, where each point, p, is joined to the next by a line. For example, a route from an originating location to a destination may include three points along the route, such as p[1], p[2], and p[3], where the points represent the next direction (i.e., at p[1], a driver has to turn left to advance to p[2]; at p[2] the driver has to turn right to advance to p[3], etc.). In one embodiment, GPS program 110 stores each of the plurality of routes in a database (not shown). In one embodiment, GPS program 110 learns which routes a user is familiar with based, at least in part, on a plurality of metrics including, but not limited to, a user's location at any point on any map, factoring in any given route at any time of day, and independent of any other factors that may be restricted in a conventional rule-based system.

GPS program 110 flags each of the one or more common sub-routes exceeding a pre-determined frequency threshold (206). In one embodiment, GPS program 110 flags each of the one or more common sub-routes exceeding a pre-determined frequency threshold by determining whether the one or more common sub-routes exceeds a pre-determined frequency threshold, wherein determining whether the one or more common sub-routes exceeds a pre-determined threshold includes comparing a number of times a user travels on the one or more common sub-routes against the pre-determined threshold, where the pre-determined frequency threshold represents a threshold indicating a sub-route is frequently traveled by a user, and may be a user defined threshold for how often two or more routes share similar points (i.e., sub-routes), a user defined threshold for how often a sub-route is included in a plurality of routes, a default setting for frequency, a frequency based on a numeric scale from, for example 1 to 10, where 1 represents a low frequency and 10 represents a high frequency, or any other suitable means for indicating frequency of a common sub-route. For example, where a user travels on one or more common sub-routes 5 or more times (a pre-determined frequency threshold), GPS program 110 may determine the one or more common sub-routes exceed the pre-determined frequency threshold. Where the one or more common sub-routes exceeds a pre-determined frequency threshold, GPS program 110 flags each of the one or more common sub-routes.

In one embodiment, GPS program 110 flags each of the one or more common sub-routes exceeding a pre-determined frequency threshold by determining whether each of one or more points within, for example, a first route, match at least one of one or more points within, for example, a second route. Responsive to a determination that at least one point in the first route matches at least one point in a second route, GPS program 110 determines a level of equivalency for the two routes, where the level of equivalency includes, for example, a distance that the two routes remain consistent (e.g., a measurable distance the two routes travel along the same points), directions at points along the two routes are the same (e.g., turn right at the end of BB Hill Rd.), latitude and longitude comparison, or any other suitable route equivalency representation. In some embodiments, GPS program 110 employs techniques including, but not limited to, dynamic programming and utilizing a spatial database to determine and flag common sub-routes via a pseudo-code algorithm. In some embodiments, GPS program 110 may restrict comparison candidates to routes that are in the same general geographical area. In some embodiments, GPS program 110 may search for common sub-routes at the beginning and end of a route. Where the level of equivalency for the two sub-routes exceeds a pre-determined frequency threshold, GPS program 110 flags each of the one or more common sub-routes.

GPS program 110 determines a calculated route to a destination (208). In one embodiment, GPS program 110 determines a calculated route to a destination by utilizing conventional satellite navigation location services to generate one or more calculated routes from an originating location to a destination based, at least in part, on user input requesting navigation instructions to the destination and one or more conventional default navigation rules (e.g., shortest route, quickest route, highway only, secondary roads only, etc.). In another embodiment, GPS program 110 may determine a calculated route to a destination by retrieving a pre-calculated route from a GPS system installed on a client device, such as client device 106 and client device 108. In one embodiment, GPS program 110 determines a calculated route for a particular journey to include a familiar common sub-route, such that the particular journey is easier for a user to navigate as it includes well known and familiar common sub-routes.

GPS program 110 identifies one or more flagged common sub-routes within the calculated route (210). In one embodiment, GPS program 110 identifies one or more flagged common sub-routes within the calculated route by retrieving the one or more flagged common sub-routes from a database, and comparing the calculated route against the one or more flagged common sub-routes. In one embodiment, GPS program 110 identifies one or more flagged common sub-routes existing within the calculated route where the one or more flagged common sub-routes match one or more segments (i.e., fragments) of the calculated route. For example, GPS program 110 may identify one or more flagged common sub-routes within a calculated route where a first common sub-route, such as "turn right at p[1], continuing straight to p[2], then turn left at p[3]", matches a direction sequence within the calculated route.

GPS program 110 suppresses instructions for each identified flagged common sub-route (212). In one embodiment, GPS program 110 suppresses instructions for each identified flagged common sub-route by substituting each identified flagged common sub-route into the calculated route, such that, for each identified flagged common sub-route, instead of announcing each direction within the flagged common sub-route, GPS program 110 instructs a user to continue to a next direction following the flagged common sub-route. For example, for the duration of the flagged common sub-route (i.e., for each direction making up the flagged common sub-route), GPS program may instruct a user to drive to the next direction after the flagged common sub-route, such as "drive to join M3 at junction 9". In one embodiment, GPS program 110 stores the next direction subsequent to each flagged common sub-route, such that GPS program 110 announces detailed instructions for the next direction in a seamless transition. For example, GPS program 110 may announce detailed instructions for the next direction (i.e., instruct a user how to reach the next direction) as a user reaches the end of a flagged common sub-route, such as "continue straight to join M3 at junction 9".

In one embodiment, during the flagged common sub-route, GPS program 110 may augment one or more function aspects of a GPS system, such as enabling a lower power mode (i.e., a power save mode) for satellite navigation, where the lower power mode may include, without limitation, dimming a screen on a client device, such as client device 106 and client device 108, and searching for an updated GPS location less frequently, etc. In one embodiment, during the flagged common sub-route, GPS program 110 may continue to monitor the location of a user relative to the flagged common sub-route, such that GPS program 110 may announce a warning that the user is no longer following the flagged common sub-route. In another embodiment, GPS program 110 may instruct a user to redirect off of a flagged common sub-route when traffic is dense along the flagged common sub-route. In one embodiment, GPS program 110 may prompt a user to confirm that suppression of detailed instructions for each identified flagged common sub-routes is desired (e.g., "do you know how to drive to join M3 at junction 9").

Figure 3:
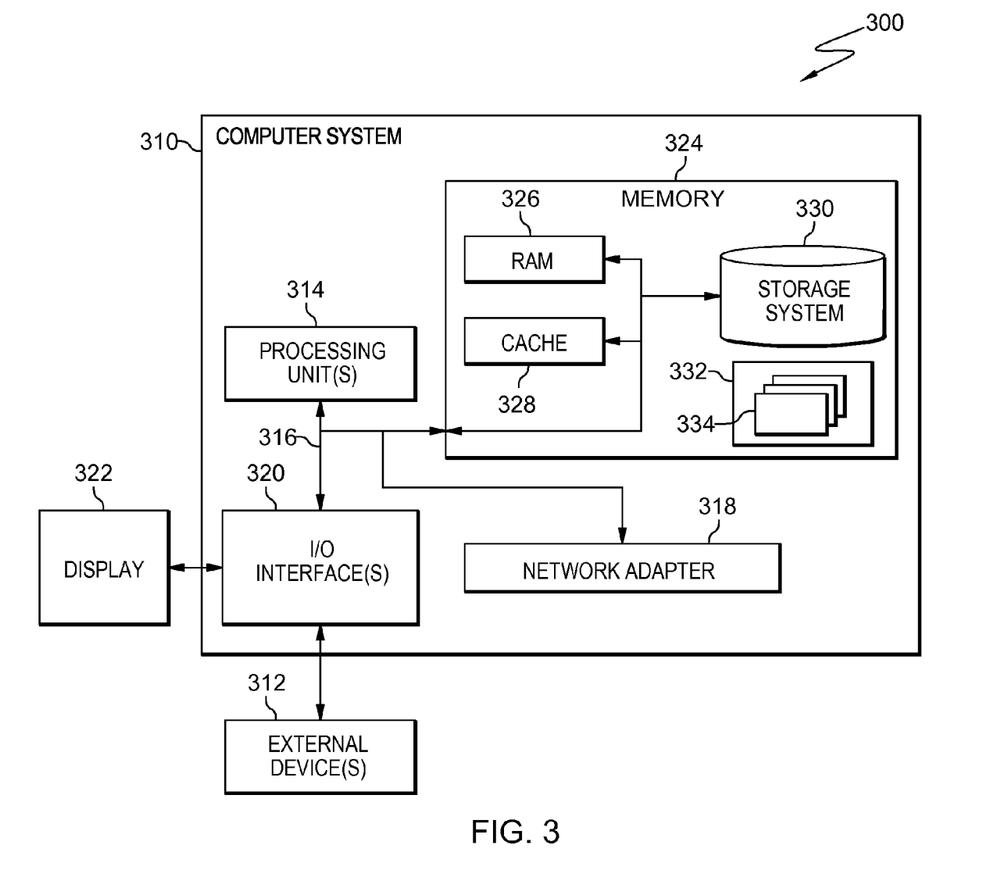
FIG. 3 is a block diagram depicting components of a data processing environment (such as the server of FIG. 1), in accordance with an embodiment of the present invention.

FIG. 3 is a block diagram depicting components of a data processing environment, such as server 104 of data processing environment 100, generally designated 300, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, computer system 310 in data processing environment 100 is shown in the form of a general-purpose computing device, such as server 104 of FIG. 1. The components of computer system 310 may include, but are not limited to, one or more processors or processing unit 314, memory 324, and bus 316 that couples various system components including memory 324 to processing unit 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for improving route navigation assistance on a client device, the method comprising:

monitoring, by one or more computer processors, a plurality of routes, wherein the plurality of routes are routes travelled by a user in a plurality of successive journeys;

determining, by one or more computer processors, one or more common sub-routes within the plurality of routes, the one or more common sub-routes having a plurality of points in common with each other;

determining, by one or more computer processors, whether the one or more common sub-routes exceed a pre-determined threshold, wherein determining includes comparing a number of times the user travels the one or more common sub-routes against the pre-determined threshold, wherein the pre-determined threshold is a user defined threshold indicating the one or more common sub-routes is frequently traveled by the user;

responsive to a determination that the number of times the user travels the one or more common sub-routes exceeds the pre-determined threshold, flagging, by one or more computer processors, each of the one or more common sub-routes exceeding the pre-determined threshold, wherein flagging includes determining a measurable distance the one or more common sub-routes have the plurality of points in common;

identifying, by one or more computer processors, one or more flagged common sub-routes within a calculated route, wherein identifying includes determining the calculated route for a journey, wherein the calculated route includes the one or more flagged common sub-routes, and determining at least one of the one or more flagged common sub-routes matches one or more direction sequences of the calculated route;

suppressing, by one or more computer processors, route navigation assistance for one or more identified flagged common sub-routes, wherein suppressing includes substituting one or more matched direction sequences of the calculated route with the one or more identified flagged common sub-routes, prompting the user to confirm suppression of detailed instructions for each identified flagged common sub-routes is desired, and responsive to the user confirming suppression of the detailed instructions is desired, suppressing the detailed instructions for each of the one or more identified flagged common sub-routes; and responsive to the user continuing to the next direction following the one or more identified flagged common sub-routes in the calculated route, augmenting, by one or more computer processors, one or more functions of the client device, wherein augmenting includes enabling a power save mode while traveling the one or more identified flagged common sub-routes, wherein the power save mode includes searching for an updated GPS location of the client device less frequently.

2. The method of claim 1, wherein monitoring a plurality of routes, further comprises at least one of:
   monitoring, by one or more computer processors, the plurality of routes passively;
   monitoring, by one or more computer processors, the plurality of routes actively; and
   monitoring, by one or more computer processors, the plurality of routes utilizing a combination of passive and active monitoring.

3. The method of claim 1, wherein determining one or more common sub-routes within the plurality of routes, further comprises:
   modeling, by one or more computer processors, each of the plurality of routes as a route, r, wherein the route includes an ordered set of points, p, joined by one or more lines on a two-dimensional plane; and
   storing, by one or more computer processors, each modeling of the plurality of routes in a database.

4. The method of claim 1, wherein flagging each of the one or more common sub-routes exceeding a pre-determined threshold, further comprises:
   storing, by one or more computer processors, one or more flagged common sub-routes to a database.

5. The method of claim 1, further comprising:
   responsive to a determination that at least one point in the first route matches at least one point in a second route, determining, by one or more computer processors, a level of equivalency between the first route and the second route;
   wherein determining a level of equivalency includes determining a distance that the first route and the second route remain consistent and determining one or more directions at the at least one point are the same along the distance that the first route and the second route remain consistent; and
   determining, by one or more computer processors, the level of equivalency exceeds a pre-determined threshold.

6. The method of claim 1, wherein identifying one or more flagged common-sub-routes within a calculated route, further comprises:
   retrieving, by one or more computer processors, one or more flagged common sub-routes from a database; and
   determining, by one or more computer processors, at least one of the one or more flagged common sub-routes match at least one segment of the calculated route.

7. A computer program product for improving route navigation assistance on a client device, the computer program product comprising:
   one or more computer readable storage devices and program instructions stored on the one or more computer readable storage devices, the program instructions comprising:
   program instructions to monitor a plurality of routes, wherein the plurality of routes are routes travelled by a user in a plurality of successive journeys;
   program instructions to determine one or more common sub-routes within the plurality of routes, the one or more common sub-routes having a plurality of points in common with each other;
   program instructions to determine whether the one or more common sub-routes exceed a pre-determined threshold, wherein determining includes comparing a number of times the user travels the one or more common sub-routes against the pre-determined threshold, wherein the pre-determined threshold is a user defined threshold indicating the one or more common sub-routes is frequently traveled by the user;
   responsive to a determination that the number of times the user travels the one or more common sub-routes exceeds the pre-determined threshold, program instructions to flag each of the one or more common sub-routes exceeding the pre-determined threshold, wherein flagging includes determining a measurable distance the one or more common sub-routes have the plurality of points in common;
   program instructions to identify one or more flagged common sub-routes within a calculated route, wherein identifying includes determining the calculated route for a journey, wherein the calculated route includes the one or more flagged common sub-routes, and determining at least one of the one or more flagged common sub-routes matches one or more direction sequences of the calculated route;
   program instructions to suppress route navigation assistance for one or more identified flagged common sub-routes, wherein suppressing includes one or more matched direction sequences of the calculated route with the one or more identified flagged common sub-routes, prompting the user to confirm suppression of detailed instructions for each identified flagged common sub-routes is desired, and responsive to the user confirming suppression of the detailed instructions is desired, suppressing the detailed instructions for each of the one or more identified flagged common sub-routes; and
   responsive to the user continuing to the next direction following the one or more identified flagged common sub-routes in the calculated route, program instructions to augment one or more functions of the client device, wherein augmenting includes enabling a power save mode while traveling the one or more identified flagged common sub-routes, wherein the power save mode includes searching for an updated GPS location of the client device less frequently.

8. The computer program product of claim 7, wherein program instructions to monitor a plurality of routes, further comprises at least one of:
   program instructions to monitor the plurality of routes passively;
   program instructions to monitor the plurality of routes actively; and
   program instructions to monitor the plurality of routes utilizing a combination of passive and active monitoring.

9. The computer program product of claim 7, wherein program instructions to determine one or more common sub-routes within the plurality of routes, further comprises:
   program instructions to model each of the plurality of routes as a route, r, wherein the route includes an ordered set of points, p, joined by one or more lines on a two-dimensional plane; and
   program instructions to store each modeling of the plurality of routes in a database.

10. The computer program product of claim 7, wherein program instructions to flag each of the one or more common sub-routes exceeding a pre-determined threshold, further comprises:
   program instructions to store one or more flagged common sub-routes to a database.

11. The computer program product of claim 7, further comprising:
   responsive to a determination that at least one point in the first route matches at least one point in a second route, program instructions to determine a level of equivalency between the first route and the second route;
   wherein determining a level of equivalency includes determining a distance that the first route and the second route remain consistent and determining one or more directions at the at least one point are the same along the distance that the first route and the second route remain consistent; and
   determining, by one or more computer processors, the level of equivalency exceeds a pre-determined threshold.

12. The computer program product of claim 7, wherein program instructions to identify one or more flagged common-sub-routes within a calculated route, further comprises:
   program instructions to retrieve, one or more flagged common sub-routes from a database; and
   program instructions to determine at least one of the one or more flagged common sub-routes match at least one segment of the calculated route.

13. A computer system for improving route navigation assistance on a client device, the computer system comprising:
   one or more computer processors;
   one or more computer readable storage devices;
   program instructions stored on at least one of the one or more computer readable storage devices for execution by at least one of the one or more computer processors, the program instructions comprising:
   program instructions to monitor a plurality of routes, wherein the plurality of routes are routes travelled by a user in a plurality of successive journeys;
   program instructions to determine one or more common sub-routes within the plurality of routes, the one or more common sub-routes having a plurality of points in common with each other;
   program instructions to determine whether the one or more common sub-routes exceed a pre-determined threshold, wherein determining includes comparing a number of times the user travels the one or more common sub-routes against the pre-determined threshold, wherein the pre-determined threshold is a user defined threshold indicating the one or more common sub-routes is frequently traveled by the user;
   responsive to a determination that the number of times the user travels the one or more common sub-routes exceeds the pre-determined threshold, program instructions to flag each of the one or more common sub-routes exceeding the pre-determined threshold, wherein flagging includes determining a measurable distance the one or more common sub-routes have the plurality of points in common;
   program instructions to identify one or more flagged common sub-routes within a calculated route, wherein identifying includes determining the calculated route for a journey, wherein the calculated route includes the one or more flagged common sub-routes, and determining at least one of the one or more flagged common sub-routes matches one or more direction sequences of the calculated route;
   program instructions to suppress route navigation assistance for one or more identified flagged common sub-routes, wherein suppressing includes substituting one or more matched direction sequences of the calculated route with the one or more identified flagged common sub-routes, prompting the user to confirm suppression of detailed instructions for each identified flagged common sub-routes is desired, and responsive to the user confirming suppression of the detailed instructions is desired, suppressing the detailed instructions for each of the one or more identified flagged common sub-routes; and
   responsive to the user continuing to the next direction following the one or more identified flagged common sub-routes in the calculated route, program instructions to augment one or more functions of the client device, wherein augmenting includes enabling a power save mode while traveling the one or more identified flagged common sub-routes, wherein the power save mode includes searching for an updated GPS location of the client device less frequently.

14. The computer system of claim 13, wherein program instructions to monitor a plurality of routes, further comprises at least one of:
   program instructions to monitor the plurality of routes passively;
   program instructions to monitor the plurality of routes actively; and
   program instructions to monitor the plurality of routes utilizing a combination of passive and active monitoring.

15. The computer system of claim 13, wherein program instructions to determine one or more common sub-routes within the plurality of routes, further comprises:
   program instructions to model each of the plurality of routes as a route, r, wherein the route includes an ordered set of points, p, joined by one or more lines on a two-dimensional plane; and
   program instructions to store each modeling of the plurality of routes in a database.

16. The computer system of claim 13, wherein program instructions to flag each of the one or more common sub-routes exceeding a pre-determined threshold, further comprises:
   program instructions to store one or more flagged common sub-routes to a database.

17. The computer system of claim 13, further comprising:
   responsive to a determination that at least one point in the first route matches at least one point in a second route, program instructions to determine a level of equivalency between the first route and the second route;
   wherein determining a level of equivalency includes determining a distance that the first route and the second route remain consistent and determining one or more directions at the at least one point are the same along the distance that the first route and the second route remain consistent; and
   determining, by one or more computer processors, the level of equivalency exceeds a pre-determined threshold.

* * * * *